United States Patent Office 3,303,235
Patented Feb. 7, 1967

3,303,235
UNSATURATED HYDROCARBONS BY OXIDATIVE DEHYDROGENATION OVER A CATALYST COMPRISING ZINC AND IRON
Louis J. Croce, East Brunswick, Laimonis Bajars, Princeton, and Maigonis Gabliks, Highland Park, N.J., assignors to Petro-Tex Chemical Corporation, Houston, Tex., a corporation of Delaware
No Drawing. Filed Jan. 2, 1964, Ser. No. 335,351
18 Claims. (Cl. 260—680)

This invention relates to a process for dehydrogenating organic compounds and relates more particularly to the dehydrogenation of hydrocarbons at elevated temperatures in the presence of oxygen and a particular catalyst.

We have now discovered that greatly improved yields and high selectivities of unsaturated hydrocarbons are obtained by dehydrogenating under certain specified conditions hydrocarbons in the vapor phase at elevated temperatures in the presence of oxygen and a catalyst comprising zinc ferrite.

Zinc ferrite is a known commercial product which is useful, for example, in the formation of coatings suitable for high temperature applications. One method for the formation of zinc ferrite is by the reaction under certain conditions of iron carbonate with zinc carbonate in the presence of an atmosphere containing oxygen and a catalyst for the formation of the ferrite.

More specifically, a method for the preparation of zinc ferrite is to first mix a water solution of zinc sulfate with a solution of iron sulfate. The solution may then be heated to less than 100° C. and the iron and zinc are precipitated as the carbonates by adding sodium carbonate. The water is removed from the precipitate and the precipitate washed. Thereafter zinc chloride may be added as a catalyst and the composition then heated to about 850° C. for about 30 minutes to form the zinc ferrite. The reaction product may then be ground and pelleted into catalyst particles.

Hydrocarbons to be dehydrogenated according to the process of this invention are hydrocarbons of 4 to 7 carbon atoms and preferably are aliphatic hydrocarbons selected from the group consisting of saturated hydrocarbons, monoolefins, diolefins and mixtures thereof of 4 to 5 or 6 carbon atoms having a straight chain of at least four carbon atoms, and cycloaliphatic hydrocarbons. Examples of preferred feed materials are butene-1, cis-butene-2, trans-butene-2, 2-methylbutene-3, 2-methylbutene-1, 2-methylbutene-2, n-butane, butadiene-1,3, cyclohexene, methyl butane, 2-methylpentene-1, 2-methylpentene-2 and mixtures thereof. For example, n-butane may be converted to a mixture of butene-1 and butene-2 or may be converted to a mixture of butene-1, butene-2 and/or butadiene-1,3. A mixture of n-butane and butene-2 may be converted to butadiene-1,3 or to a mixture of butadiene-1,3 together with some butene-2 and butene-1. Vinyl acetylene may be present as a product, particularly when butadiene-1,3 is used as a feedstock. Thus, the process of this invention is useful in converting hydrocarbons to less saturated hydrocarbons of the same number of carbon atoms. Particularly the preferred products are butadiene-1,3 and isoprene. Useful feeds may be mixed hydrocarbon streams such as refinery streams, for example, the feed material may be the olefin containing hydrocarbon mixture obtained as the product from the dehydrogenation of hydrocarbons. For example, in the production of gasoline from higher hydrocarbons by either thermal or catalytic cracking a hydrocarbon stream containing predominantly hydrocarbons of 4 carbon atoms may be produced and may comprise a mixture of butenes together with butadiene, butane, isobutane, isobutylene and other ingredients in minor amounts. These and other refinery by-products which contain normal, ethylenically unsaturated hydrocarbons are useful as starting materials. Although various mixtures of hydrocarbons are useful, the preferred hydrocarbon feed contains at least 50 weight percent of a hydrocarbon selected from the group consisting of butene-1, butene-2, n-butane, butadiene-1,3 and mixtures thereof, and more preferably contains at least 70 weight percent, of one or more of these hydrocarbons (with both of these percentages being based on the total weight of the organic composition of the feed to the reactor). Any remainder may be, for example, essentially aliphatic hydrocarbons. This invention is particularly useful to provide a process whereby the major product of the hydrocarbon converted is a dehydrogenated hydrocarbon product having the same number of carbon atoms as the hydrocarbon fed.

Oxygen will be present in the reaction zone in an amount within the range of 0.2 to 2.5 mols of oxygen per mol of hydrocarbon to be dehydrogenated. Generally, better results may be obtained if the oxygen concentration is maintained between about 0.25 and about 1.6 mols of oxygen per mol of hydrocarbon to be dehydrogenated, such as between 0.35 and 1.2 mols of oxygen. The oxygen may be fed to the reactor as pure oxygen, as air, as oxygen-enriched air, oxygen mixed with diluents and so forth. Based on the total gaseous mixture entering the reactor, the oxygen ordinarily will be present in an amount from about 0.5 to 25 volume percent of the total gaseous mixture, and more usually will be present in an amount from about 1 to 15 volume percent of the total. The total amount of oxygen utilized may be introduced into the gaseous mixture entering the catalytic zone or sometimes it has been found desirable to add the oxygen in increments, such as to different sections of the reactor. The above described proportions of oxygen employed are based on the total amount of oxygen used. The oxygen may be added directly to the reactor or it may be premixed, for example, with a diluent or steam.

The temperature for the dehydrogenation reaction will be greater than 250° C., such as greater than about 300° C. or 375° C., and the maximum temperature in the reactor may be about 650° C. or 750° C. or perhaps higher under certain circumstances. However, excellent results are obtained within the range of or about 300° C. to 575° C. such as from or about 325° C. to or about 525° C. The temperatures are measured at the maximum temperature in the reactor. An advantage of this invention is that lower temperatures of dehydrogenation may be utilized than are possible in conventional dehydrogenation processes. Another advantage is that large quantities of heat do not have to be added to the reaction as was previously required.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 p.s.i.a. Preferably the total pressure will be less than about 75 p.s.i.a. and excellent results are obtained at about atmospheric pressure.

The initial partial pressure of the hydrocarbon to be dehydrogenated will be equivalent to less than one-half atmosphere at a total pressure of one atmosphere. Generally the combined partial pressure of the hydrocarbon to be dehydrogenated together with the oxygen will also be equivalent to less than one-half atmosphere at a total pressure of one atmosphere. Preferably, the initial partial pressure of the hydrocarbon to be dehydrogenated will be equivalent to no greater than one-third atmosphere or no greater than one-fifth atmosphere at a total pressure of one atmosphere. Also, preferably, the initial partial pressure of the combined hydrocarbon to be dehydrogenated plus the oxygen will be equivalent to no greater than one-third or no greater than one-fifth atmosphere at a total pressure of one atmosphere. Reference to the initial partial pressure of the hydrocarbon to be dehydrogenated means the partial pressure of the hydrocarbon as it first contacts the catalytic particles. An equivalent partial pressure at a total pressure of one atmosphere simply means that one atmosphere total pressure is a reference point and does not imply that the total pressure of the reaction must be operated at atmospheric pressure. For example, in a mixture of one mol of butene, three mols of steam, and one mol of oxygen under a total pressure of one atmosphere, the butene would have an absolute pressure of one-fifth of the total pressure, or roughly six inches of mercury absolute pressure. Equivalent to this six inches of mercury butene absolute pressure at atmospheric pressure would be butene mixed with oxygen under a vacuum such that the partial pressure of the butene is 6 inches of mercury absolute. The combination of a diluent such as nitrogen, together with the use of a vacuum may be utilized to achieve the desired partial pressure of the hydrocarbon. For the purpose of this invention, also equivalent to the six inches of mercury butene absolute pressure at atmospheric pressure would be the same mixture of one mol of butene, three mols of steam and one mol of oxygen under a total pressure greater than atmospheric, for example, a total pressure of 20 p.s.i.a. Thus, when the total pressure in the reaction zone is greater than one atmosphere, the absolute values for the pressure of the hydrocarbon to be dehydrogenated will be increased in direct proportion to the increase in total pressure above one atmosphere.

The partial pressures described above may be maintained by the use of diluents such as nitrogen, helium or other gases. Conveniently, the oxygen may be added as air with the nitrogen acting as a diluent for the system. Mixtures of diluents may be employed. Volatile compounds which are not dehydrogenated or which are dehydrogenated only to a limited extent may be present as diluents.

Preferably the reaction mixture contains a quantity of steam, with the range generally being between about 2 and 40 mols of steam per mol of hydrocarbon to be dehydrogenated. Preferably steam will be present in an amount from about 3 to 35 mols per mol of hydrocarbon to be dehydrogenated and excellent results have been obtained within the range of about 8 to about 30 mols of steam per mol of hydrocarbon to be dehydrogenated. The functions of the steam are several-fold, and the steam does not merely act as a diluent. Diluents generally may be used in the same quantities as specified for the steam. Excellent results are obtained when the gaseous composition fed to the reactor consists essentially of hydrocarbons, inert diluents and oxygen as the sole oxidizing agent.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally, the flow rates will be within the range of about 0.10 to 25 liquid volumes of the hydrocarbon to be dehydrogenated per volume of reactor containing catalyst per hour (referred to as LHSV), wherein the volumes of hydrocarbon are calculated at standard conditions of 25° C. and 760 mm. of mercury. Usually, the LHSV will be between 0.15 and about 5 or 10. The volume of reactor containing catalyst is that volume of reactor space excluding the volume displaced by the catalyst. For example, if a reactor has a particular volume of cubic feet of void space, when that void space is filled with catalyst particles, the original void space is the volume of reactor containing catalyst for the purpose of calculating the flow rate. The gaseous hourly space velocity (GHSV) is the volumes of the hydrocarbon to be dehydrogenated in the form of vapor calculated under standard conditions of 25° C. and 760 mm. of mercury per volume of reactor space containing catalyst per hour. Generally, the GHSV will be between about 25 and 6400, and excellent results have been between about 38 and 3800. Suitable contact times are, for example, from about 0.001 or higher to about 5 or 10 seconds, with particularly good results being obtained between 0.01 and 3 seconds. The contact time is the calculated dwell time of the reaction mixture in the reaction zone, assuming the mols of product mixture are equivalent to the mols of feed mixture. For the purpose of calculation of residence times, the reaction zone is the portion of the reactor containing catalyst.

The catalytic surface described is the surface which is exposed in the dehydrogenation zone to the reactor, that is, if a catalyst carrier is used, the composition described as a catalyst refers to the composition of the surface and not to the total composition of the surface coating plus carrier. Inert catalyst binding agents or fillers may be used, but these will not ordinarily exceed about 50 percent or 60 percent by weight of the catalytic surface. The quantity of catalyst utilized will be dependent upon such variables as the temperature of reaction, the concentration of oxygen, the age of the catalyst, the flow rates of the reactants, and so forth. The catalyst will by definition be present in a catalytic amount and generally the zinc ferrite will be the main active constituent. The amount of catalyst will ordinarily be present in an amount greater than 10 square feet of catalyst surface per cubic foot of reaction zone containing catalyst. Of course, the amount of catalyst may be much greater, particularly when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors, including the particle size, particle size distribution, apparent bulk density of the particles, amount of active catalyst coated on the carrier, density of the carrier, and so forth. Typical values for the surface to weight ratio are such as about one-half to 200 square meters per gram, although higher and lower values may be used.

The dehydrogenation reactor may be of the fixed bed or fluid bed type. Conventional reactors for the production of unsaturated hydrocarbons are satisfactory. Excellent results have been obtained by packing the reactor with catalyst particles as the method of introducing the catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, pumice and the like. When carriers are used, the amount of catalyst on the carrier will generally be between about 5 to 75 weight percent of the total weight of the active catalytic material plus carrier. Another method for introducing the required surface is to utilize as a reactor a small diameter tube wherein the tube wall is catalytic or is coated with catalytic material. Other methods may be utilized to introduce the catalytic surface such as by the use of rods, wires, mesh, or shreds and the like of catalytic material.

Although excellent results are obtained with the catalysts of this invention with a feed containing only the hydrocarbon, oxygen and perhaps steam or a diluent, it is one of the advantages of this invention that halogen may also be added to the reaction gases to give excellent results. The addition of halogen to the feed is particularly effective when the hydrocarbon to be dehydrogenated is saturated.

The source of any halogen fed to the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides such as ethyl iodide, methyl bromide, 1,2-dibromo ethane, ethyl bromide, amyl bromide and allyl bromide; cycloaliphatic halides such as cyclohexylbromide; aromatic halides such as benzyl bromide; halohydrins such as ethylene bromohydrin; halogen substituted aliphatic acids such as bromoacetic acid; ammonium iodide; ammonium bromide; ammonium chloride; organic amine halide salts such as methyl amine hydrobromide; and the like. Mixtures of various sources of halogen may be used. The preferred sources of halogen are iodine, bromine and chlorine and compounds thereof such as hydrogen bromide, hydrogen iodide, hydrogen chloride, ammonium bromide, ammonium iodide, ammonium chloride, alkyl halides of one to six carbon atoms and mixtures thereof, with the iodine and bromine compounds being particularly preferred, and the best results having been obtained with ammonium iodide, bromide or chloride. When terms such as halogen liberating materials or halogen materials are used in the specification and claims, this includes any source of halogen such as elemental halogens, hydrogen halides or ammonium halides. The amount of halogen, calculated as elemental halogen, may be as little as about 0.0001 or less mol of halogen per mol of the hydrocarbon compound to be dehydrogenated to as high as 0.2 or 0.5 or higher. The preferred range is from about 0.001 to 0.09 mol of halogen per mol of the hydrocarbon to be dehydrogenated.

According to this invention, the catalyst is autoregenerative and the process is continuous. Moreover, small mounts of tars and polymers are formed as compared to some prior art processes.

The catalysts are not limited to those illustrated in the examples. Other methods of catalyst preparation may be employed. The atoms of iron will be present in an amount from 20 to 95 weight percent, based on the total weight of the atoms of iron and zinc in the catalyst surface, but a preferred ratio is from 51 to 80 weight percent iron. Particularly preferred are catalysts having a weight percent of iron from about 55 to 79 percent by weight iron based on the total weight of atoms of iron and zinc. Valuable catalysts were produced comprising as the main active constituents iron, zinc, and oxygen in the catalytic surface exposed to the reaction gases. High yields of product are obtained with catalysts having iron as the predominant metal in the catalytic surface. Suitable catalysts may contain less than 5 weight percent sodium or potassium based on the weight of zinc and iron. Preferably at least about 50 and generally at least about 65 weight percent of the atoms of zinc and iron will be present as zinc ferrite. The preferred zinc ferrite is that having a face-centered cubic structure. Ordinarily the zinc ferrite will not be present in the most highly oriented crystalline structure, because it has been found that superior results may be obtained with catalysts wherein the zinc ferrite is relatively disordered. Included as catalysts are the so-called active intermediate oxides. The desired catalyst may be obtained by conducting the reaction to form the active catalyst at relatively low temperatures, that is, at temperatures lower than some of the very high temperatures used for the formation of zinc ferrites prepared for semi-conductor applications. Generally the temperature of reaction for the formation of the catalyst comprising zinc ferrite will be less than 1300° C. and preferably less than 1150° C. Of course, under certain conditions momentary temperatures above these temperatures might also be permissible. The reaction time at the elevated temperature in the formation of the catalyst may preferably be from about five minutes to four hours at elevated temperatures high enough to cause formation of zinc ferrite but less than about 1150° C. Any iron not present in the form of zinc ferrite will desirably be present predominantly as gamma iron oxide. The alpha iron oxide will preferably be present in an amount of no greater than 40 weight percent of the catalytic surface, such as no greater than about 30 weight percent.

Some improvement in catalytic activity may be obtained by reducing the catalyst of the invention. The reduction of the catalyst may be accomplished prior to the initial dehydrogenation, or the catalyst may be reduced after the catalyst has been used. It has been found that a used catalyst may be regenerated by reduction and, thus, even longer catalyst life obtained. The reduction may be accomplished with any reducing gas which is capable of reducing iron oxide to a lower valence such as hydrogen, carbon monoxide or hydrocarbons. Generally the flow of oxygen will be stopped during the reduction step. The temperature of reduction may be varied but the process is most economical at temperatures of at least about 200° C., with the upper limit being about 750° C. or 900° C. or even higher under certain conditions.

The preferred catalyst surface will generally have X-ray diffraction peaks at $d$ spacings within or about 4.83 to 4.89, 2.95 to 3.01, 2.51 to 2.57, 2.40 to 2.46, 2.08 to 2.14, 1.69 to 1.75, 1.59 to 1.65, and 1.46 to 1.52, with the most intense peak being between 2.51 to 2.57. Particularly preferred catalysts will have $d$ spacings within or about 4.81 to 4.88, 2.96 to 3.00, 2.52 to 2.56, 2.41 to 2.45, 2.09 to 2.13, 1.70 to 1.74, 1.60 to 1.64, and 1.47 to 1.51 with the most intense peak falling within or about 2.52 to 2.56. These X-ray determinations are suitably run with a cobalt tube.

In the following examples will be found specific embodiments of the invention and details employed in the practice of the invention. Percent conversion refers to the mols of hydrocarbon consumed per 100 mols of hydrocarbon fed to the reactor, percent selectivity refers to the mols of product formed per 100 mols of hydrocarbon consumed, and percent yield refers to the mols of product formed per mol of hydrocarbon fed.

*Example 1*

185 g. of ferric oxide was mixed with 900 cc. distilled water to form a slurry containing about 15 percent solid by weight. A second slurry was prepared, as described above, from 82 g. of zinc oxide. These two slurries were then combined and thoroughly mixed for two hours.

The slurry was then de-watered by filtering, and as a catalyst to form the ferrite was added an aqueous solution of zinc chloride, containing 1.4 g. zinc chloride. The mixture was then dried in an oven at a temperature of 100° C. After drying, the red solid was reacted in a furnace at a temperature of 850° C. for a period of 20 minutes. The product was then cooled to room temperature.

The reaction product was coated on ¼" x ¼" Vycor Raschig rings. Butene-2 was dehydrogenated at atmospheric pressure in a Vycor glass reactor (36" x 1" O.D.) having a 50 cc. catalyst bed supported on a 1" high layer of ¼" x ¼" O.D. Vycor Raschig rings. The butene-2, oxygen, and steam were introduced into an adapter located on top of the glass reactor, and the effluent gases were passed through a cold-water condenser to remove most of the steam. Samples of the effluent gases were withdrawn with a syringe at the exit from the condenser. They were analyzed in a Perkin-Elmer, Model 154, vapor chromatograph.

The reactor temperature was measured with a Chromel vs. Alumel thermocouple in a centrally located stainless steel thermowell ¼" O.D. Heat was supplied by a three-section 1400 watt furnace, each section having a separate powerstat, and the heat input was controlled manually.

The butene-2 used was C.P. grade, 99.0 mol percent minimum; the oxygen was commercial grade, purity 99.5+, and steam was generated in a stainless steel tube (12" x 1" O.D.) using distilled water made in the laboratory.

A mixture of butene-2, oxygen and steam was fed to the reactor in an amount of 0.8 mol of oxygen per mol of butene-2 and 30 mols of steam per mol of butene-2. The butene-2 was fed at a rate of 1.0 LHSV (with calculation being based on the volume of the reactor containing catalyst, that is the 50 cc. catalyst section). The maximum temperature in the catalyst bed was 440° C. Under these conditions 77 mol percent of the butene-2 was converted at a selectivity of 90 mol percent to butadiene-1,3 for a yield of 69 mol percent butadiene-1,3 per pass.

*Example 2*

Zinc ferrite (Columbian Carbon Company EG-2, having about 32.6 to 32.8 weight percent zinc calculated as zinc oxide) particles were packed in the reactor described in Example 1. The catalyst bed was 50 cc. in volume. A mixture of butene-2, oxygen and steam was fed to the reactor in an amount of 0.5 mol of oxygen per mol of butene-2 and 30 mols of steam per mol of butene-2. The butene-2 was fed at a rate of 1.0 LHSV. Under these conditions the yield of butadiene-1,3 was 70 mol percent per pass based on the mols of butene-2 fed to the reactor.

*Example 3*

The general testing procedure of Example 2 was repeated. The material used for the catalyst was zinc ferrite (Columbian Carbon Company, type EG-2). Butene-2 was dehydrogenated using oxygen in a molar ratio of 0.4 mol of oxygen per mol of butene-2. Steam was employed in a ratio of 30 mols of steam per mol of butene-2. At a flow rate of 0.5 LHSV and at a maximum temperature in the reactor of 375° C. the butene-2 was dehydrogenated to butadiene-1,3 at a yield of 61 mol percent of the butene-2 fed.

*Example 4*

Example 3 was repeated with the exception that the molar ratio of oxygen to butene-2 was 0.6 and the flow rate was 1.0 LHSV. At a reactor temperature of 412° C. butadiene was produced at a yield of 66 mol percent based on the butene-2 fed to the reactor.

*Example 5*

The general procedure of Example 4 was repeated with the exception that the molar ratio of oxygen to butene-2 was 0.8. At a maximum temperature in the reactor of 440° C. 77 mol percent of the butene-2 was converted at a selectivity of 90 mol percent to butadiene-1,3 to produce a yield of 69 mol percent butadiene-1,3.

*Example 6*

A catalyst comprising zinc ferrite was formed from ½ mol of ZnO and 1 mol of $Fe_2O_3$. The dry metal oxides were thoroughly mixed prior to the reaction to form the zinc ferrite. Zinc ferrite was formed by reacting the combination of oxides at 850° C. Butene-2 was dehydrogenated to butadiene-1,3 utilizing 0.5 mol of oxygen per mol of butene-2 together with 30 mols of steam per mol of butene-2. The flow rate was 1.0 LHSV and the catalyst volume was 50 cc. At a reactor temperature of 405° C. butadiene was formed at a yield of 67 mol percent based on the butene-2 fed.

*Example 7*

A zinc ferrite catalyst was formed from iron nitrate and zinc nitrate. The nitrates were used in a ratio equivalent to 0.55 mol of $Fe_2O_3$ and 0.45 mol of ZnO. The catalytic composition was deposited on an inert cylindrical carrier. After the nitrates had been decomposed the zinc ferrite was formed by reacting the composition at 800° C. for sixty minutes. Utilizing a flow rate of 1.0 LHSV, a steam ratio of 30 mols and an oxygen ratio of 0.75 mol of oxygen per mol of butene-2, butene-2 was dehydrogenated to butadiene at a reactor temperature of 450° C. at a conversion of 60 mol percent and a selectivity of 92 mol percent to give a yield of butadiene of 55 mol percent.

*Example 8*

Example 7 was repeated with the exception that the catalytic composition was reacted at 850° C. for 20 minutes instead of 800° C. for sixty minutes. At a reactor temperature of 450° C., 70 mol percent of the butene-2 was converted at a selectivity of 92 mol percent to give a yield of 64 mol percent of butadiene-1,3.

*Example 9*

Example 8 was repeated with the exception that iron nitrate and zinc nitrate were used in amounts equivalent to 0.45 mol of $Fe_2O_3$ per 0.55 mol of ZnO under the same reaction conditions as in Example 8. The yield of butadiene-1,3 was 62 mol percent.

*Example 10*

Example 8 was repeated with the exception that the catalytic composition was formed by reacting at 700° C. for a period of 60 minutes. Utilizing the same reaction conditions as in Example 8, the yield of butadiene-1,3 was 69 mol percent.

*Example 11*

The general procedure of Example 1 was repeated utilizing 2-methylbutene-2 for the feed instead of butene-2. Zinc ferrite was used as the catalyst. The ratio of oxygen to 2-methylbutene-2 was 0.5, and 25 mols of steam were used per mol of 2-methylbutene-2. Additionally, 5 mols of helium were also employed per mol of 2-methylbutene-2. At a flow rate of 0.5 LHSV and at a maximum temperature in the reactor of 400° C., the mol percent yield of isoprene was 53 based on the mols of 2-methylbutene-2 fed to the reactor.

*Example 12* n-Butane was dehydrogenated to butene and butadiene using a zinc ferrite catalyst (Columbian Carbon Company, EG-2). Bromine was also added to the reaction mixture in an amount of 0.08 mol of $Br_2$ per mol of n-butane. Oxygen was fed at a rate of 1.25 mols of $O_2$ per mol of n-butane. Helium was employed at a ratio of 20 mols of helium per mol of n-butane. At a flow rate of 0.2 LHSV and at a reactor temperature of 575° C. 61 mol percent butadiene was formed together with a small amount of butene. The total selectivity to butene and butadiene was 75 mol percent.

*Example 13*

Butene-2 was dehydrogenated to butadiene-1,3 utilizing 0.8 mol of $O_2$, 20 mols of helium and 0.03 mol of $Br_2$ respectively per mol of butene-2 fed. The flow rate was 0.6 LHSV. At a reactor temperature of 550° C. 78 mol percent butadiene was produced.

*Example 14* n-Butane was dehydrogenated to butene and butadiene using Columbian Carbon Company zinc ferrite EG-2. Flow rates of 1.25 mols of oxygen and 20 mols of helium per mol of n-butane were used. The LHSV was 0.2 and a small amount of chlorine was also added to the feed. The combined yield of butene and butadiene was 58 mol percent based on the butane fed.

*Example 15*

A catalyst was produced using equal molar ratios of ZnO and $Fe_2O_3$. At a flow rate of 1.0 LHSV and utilizing 50 cc. of catalyst, butadiene-1,3 was obtained at a yield of 66 mol percent at a reactor temperature of 392° C. 30 mols of steam and 0.5 mol of oxygen were used per mol of butene-2 fed.

We claim:
1. A process for the dehydrogenation of aliphatic hydrocarbons having at least four carbon atoms which comprises contacting in the vapor phase at a temperature of greater than 250° C. a mixture of the said hydrocarbon to be dehydrogenated and from 0.2 to 2.5 mols of oxygen per mol of the said hydrocarbon with a catalyst for the dehydrogenation comprising zinc ferrite to produce a dehydrogenated hydrocarbon product having the same number of carbon atoms as the said hydrocarbon.

2. A process for the dehydrogenation of aliphatic hydrocarbons having at least four carbon atoms which comprises contacting in the vapor phase at a temperature of greater than 250° C. a mixture of the said hydrocarbon to be dehydrogenated and from 0.2 to 2.5 mols of oxygen per mol of the said hydrocarbon with a catalyst for the dehydrogenation comprising zinc and iron wherein the atoms of iron are present in an amount of about 20 to 95 weight percent based on the total weight of the atoms of iron and zinc, to produce a dehydrogenated hydrocarbon product having the same number of carbon atoms as the said hydrocarbon.

3. A process for the dehydrogenation of hydrocarbons having from 4 to 5 carbon atoms which comprises contacting in the vapor phase at a temperature of greater than 250° C. a mixture of the said hydrocarbon to be dehydrogenated and from 0.2 to 2.5 mols of oxygen per mol of the said hydrocarbon with a catalyst for the dehydrogenation comprising zinc ferrite wherein the atoms of iron are present in an amount of about 20 to 90 weight percent based on the total weight of the atoms of iron and zinc, to produce a dehydrogenated hydrocarbon product having the same number of carbon atoms as the said hydrocarbon, the initial partial pressure of the said hydrocarbon being equivalent to less than one-half atmosphere at a total pressure of one atmosphere.

4. A process for the dehydrogenation of a hydrocarbon selected from the group consisting of n-butene, n-butane and mixtures thereof which comprises contacting in the vapor phase at a temperature of greater than about 325° C. a mixture of the said hydrocarbon to be dehydrogenated and from about 0.25 to about 1.6 mols of oxygen per mol of the said hydrocarbon with a catalyst for the dehydrogenation comprising zinc ferrite to produce a dehydrogenated hydrocarbon product having the same number of carbon atoms as the said hydrocarbon, the initial partial pressure of the said hydrocarbon being equivalent to less than one-half atmosphere at a total pressure of one atmosphere.

5. A process for the dehydrogenation of aliphatic hydrocarbons having at least four carbon atoms which comprises contacting in the vapor phase at a temperature of from about 325° C. to 525° C. a mixture of the said hydrocarbon to be dehydrogenated and from 0.2 to 1.6 mols of oxygen per mol of the said hydrocarbon with a catalyst for the dehydrogenation comprising zinc and iron wherein the atoms of iron are present in an amount of 40 to 85 weight percent based on the total weight of the atoms of iron and zinc, to produce a dehydrogenated hydrocarbon product having the same number of carbon atoms as the said hydrocarbon, the initial partial pressure of the said hydrocarbon being equivalent to less than one-half atmosphere at a total pressure of one atmosphere.

6. A process for the dehydrogenation of aliphatic hydrocarbons having at least four carbon atoms which comprises contacting in the vapor phase at a temperature of greater than 325° C. a mixture of the said hydrocarbon to be dehydrogenated, from 0.2 to 2.5 mols of oxygen per mol of the said hydrocarbon and from 2 to 40 mols of steam per mol of the said hydrocarbon with a catalyst for the dehydrogenation comprising zinc ferrite to produce a dehydrogenated hydrocarbon product having the same number of carbon atoms as the said hydrocarbon.

7. A process for the dehydrogenation of aliphatic hydrocarbons having at least four carbon atoms which comprises contacting in the vapor phase at a temperature of greater than 325° C. a mixture of the said hydrocarbon to be dehydrogenated and from 0.2 to 2.5 mols of oxygen per mol of the said hydrocarbon with an autoregenerative catalyst for the dehydrogenation comprising zinc and iron wherein the atoms of iron are present in an amount of 55 to 79 weight percent based on the total weight of the atoms of iron and zinc, to produce a dehydrogenated hydrocarbon product having the same number of carbon atoms as the said hydrocarbon, the initial partial pressure of the said hydrocarbon being equivalent to less than one-half atmosphere at a total pressure of one atmosphere.

8. A process for the dehydrogenation of hydrocarbons having from 4 to 5 carbon atoms which comprises contacting in the vapor phase at a temperature of at least about 375° C. a mixture of the said hydrocarbon to be dehydrogenated and from 0.35 to 1.2 mols of oxygen per mol of the said hydrocarbon with a catalyst for the dehydrogenation comprising zinc ferrite wherein the atoms of iron are present in an amount of 55 to 79 weight percent based on the total weight of the atoms of iron and zinc, to produce a dehydrogenated hydrocarbon product having the same number of carbon atoms as the said hydrocarbon, the initial partial pressure of the said hydrocarbon being equivalent to less than one-third atmosphere at a total pressure of one atmosphere.

9. A process for the dehydrogenation of a hydrocarbon selected from the group consisting of n-butene, n-butane and mixtures thereof which comprises contacting in the vapor phase at a temperature of from 375° C. to 525° C. and at a pressure of 4 p.s.i.a. to 100 p.s.i.a. a mixture of the said hydrocarbon to be dehydrogenated and from about 0.25 to about 1.6 mols of oxygen per mol of the said hydrocarbon with a catalyst for the dehydrogenation comprising zinc ferrite to produce a dehydrogenated hydrocarbon product having the same number of carbon atoms as the said hydrocarbon, the initial partial pressure of the said hydrocarbon being equivalent to less than one-fifth atmosphere at a total pressure of one atmosphere.

10. A process for the dehydrogenation of butene to butadiene-1,3 which comprises contacting in the vapor phase at a temperature of from 375° C. to 575° C. and at a total pressure of less than 75 p.s.i.a. a mixture of the said butene, from 8 to about 35 mols of steam and from 0.35 to 1.2 mols of oxygen per mol of the said butene with a catalyst for the dehydrogenation comprising zinc ferrite wherein the atoms of iron are present in an amount of 55 to 79 weight percent based on the total weight of the atoms of iron and zinc, to produce butadiene-1,3.

11. A process for the vapor phase dehydrogenation of aliphatic hydrocarbons having at least four carbon atoms which comprises contacting in the vapor phase at a temperature of greater than 250° C. a mixture of the said hydrocarbon to be dehydrogenated, from 0.2 to 2.5 mols of oxygen per mol of the said hydrocarbon and a halogen with a catalyst for the dehydrogenation comprising zinc ferrite wherein the atoms of iron are present in an amount of about 20 to 95 weight percent based on the total weight of the atoms of iron and zinc, to produce a dehydrogenated hydrocarbon product having the same number of carbon atoms as the said hydrocarbon, the initial partial pressure of the said hydrocarbon being equivalent to less than one-half atmosphere at a total pressure of one atmosphere.

12. A process for the dehydrogenation of aliphatic hydrocarbons having from 4 to 5 carbon atoms which comprises contacting in the vapor phase at a temperature of greater than 325° C. a mixture of the said hydrocarbon to be dehydrogenated, from 0.25 to 1.6 mols of oxygen per mol of the said hydrocarbon and from 0.0001 to 0.2 mols of halogen per mol of the said hydrocarbon with an autoregenerative catalyst for the dehydrogenation comprising zinc ferrite wherein the atoms of iron are present in an amount of about 40 to 85 weight percent based on the total weight of the atoms of iron and zinc, to produce a dehydrogenated hydrocarbon product having the same number of carbon atoms as the said hydrocarbon, the initial partial pressure of the said hydrocarbon being equivalent to less than one-half atmosphere at a total pressure of one atmosphere.

13. A process for the dehydrogenation of aliphatic hydrocarbons having from 4 to 5 carbon atoms which comprises contacting in the vapor phase at a temperature of greater than 325° C. a mixture of the said hydrocarbon to be dehydrogenated, from 0.25 to 1.6 mols of oxygen per mol of the said hydrocarbon and from 0.0001 to 0.2 mols of bromine per mol of the said hydrocarbon with an autoregenerative catalyst for the dehydrogenation comprising zinc ferrite wherein the atoms of iron are present in an amount of about 40 to 85 weight percent based on the total weight of the atoms of iron and zinc, to produce a dehydrogenated hydrocarbon product having the same number of carbon atoms as the said hydrocarbon, the initial partial pressure of the said hydrocarbon being equivalent to less than one-half atmosphere at a total pressure of one atmosphere.

14. A process for the dehydrogenation of a hydrocarbon selected from the group consisting of n-butene, n-butane and mixtures thereof which comprises contacting in the vapor phase at a temperature of greater than about 325° C. a mixture of the said hydrocarbon to be dehydrogenated and from about 0.25 to about 1.6 mols of oxygen per mol of the said hydrocarbon with a catalyst for the dehydrogenation comprising zinc ferrite to produce a dehydrogenated hydrocarbon product having the same number of carbon atoms as the said hydrocarbon, the said catalytic surface having x-ray diffraction peaks at $d$ spacings within the ranges of about 4.83 to 4.89, 2.95 to 3.01, 2.51 to 2.57, 2.40 to 2.46, 2.08 to 2.14, 1.69 to 1.75, 1.59 to 1.65 and 1.46 to 1.52, with the most intense peak being between about 2.51 to 2.57.

15. A process for the dehydrogenation of butene to butadiene-1,3 which comprises feeding to a reactor in the vapor phase at a temperature of at least 250° C. a gaseous mixture of the said butene and from 0.35 to 1.2 mols of oxygen per mol of the said butene with an autoregenerative catalyst for the dehydrogenation comprising zinc and iron wherein the atoms of iron are present in an amount of about 2 atoms of iron per atom of zinc based on the total weight of the atoms of iron and zinc, to produce butadiene-1,3, the initial partial pressure of the said butene being equivalent to less than one-fifth atmosphere at a total pressure of one atmosphere.

16. A process for the dehydrogenation of aliphatic hydrocarbons having at least four carbon atoms which comprises contacting in the vapor phase at a temperature of greater than 250° C. a mixture of the said hydrocarbon to be dehydrogenated and from 0.2 to 2.5 mols of oxygen per mol of the said hydrocarbon with a catalyst for the dehydrogenation comprising zinc ferrite to produce a dehydrogenated hydrocarbon product having the same number of carbon atoms as the said hydrocarbon, the initial partial pressure of the said hydrocarbon being equivalent to less than one-half atmosphere at a total pressure of one atmosphere, said catalyst having been reduced with a reducing gas.

17. A process for the preparation of butadiene-1,3 which comprises contacting in the vapor phase at a temperature of 375° C. to 525° C. and at a total pressure of about 4 p.s.i.a. to 100 p.s.i.a. a mixture of n-butene and from 0.35 to 1.2 mols of oxygen and from 8 to 35 mols of steam per mol of the said n-butene with an autoregenerative catalyst for the dehydrogenation comprising zinc ferrite wherein the atoms of iron are present in an amount of 55 to 79 weight percent based on the total weight of the atoms of iron and zinc with any iron not present in the form of zinc ferrite being predominantly present as gamma iron oxide to produce butadiene-1,3.

18. A process for the preparation of butadiene-1,3 which comprises contacting in the vapor phase at a temperature of 375°C. to 525° C. and at a total pressure of about 4 p.s.i.a. to 100 p.s.i.a. a mixture of n-butene and from 0.35 to 1.2 mols of oxygen and from 8 to 35 mols of steam per mol of the said n-butene with an autoregenerative catalyst for the dehydrogenation comprising zinc ferrite wherein the atoms of iron are present in an amount of 55 to 79 weight percent based on the total weight of the atoms of iron and zinc with any iron not present in the form of zinc ferrite being predominently present as gamma iron oxide to produce butadiene-1,3, and after the yield of butadiene-1,3 has fallen off after continued use regenerating the catalyst by reducing the catalyst with hydrogen.

References Cited by the Examiner

UNITED STATES PATENTS

| | | | |
|---|---|---|---|
| 3,168,587 | 2/1965 | Michaels et al. | 260—683.3 |
| 3,179,707 | 4/1965 | Lee | 260—669 |
| 3,207,811 | 9/1965 | Bajars | 260—680 |

DELBERT E. GANTZ, *Primary Examiner.*

G. E. SCHMITKONS, *Assistant Examiner.*